3,191,435
PRODUCTION OF HOT GASEOUS STREAMS AND USE OF SUCH STREAMS IN AERODYNAMIC TESTING

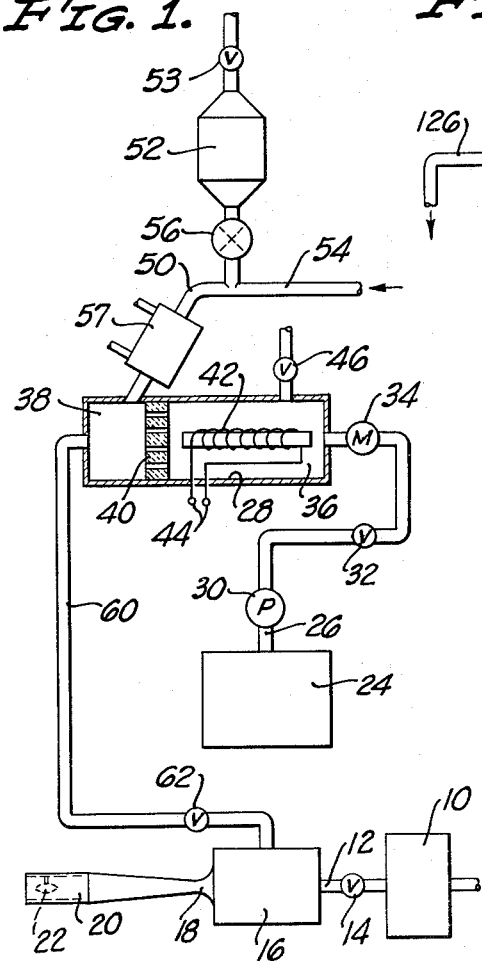
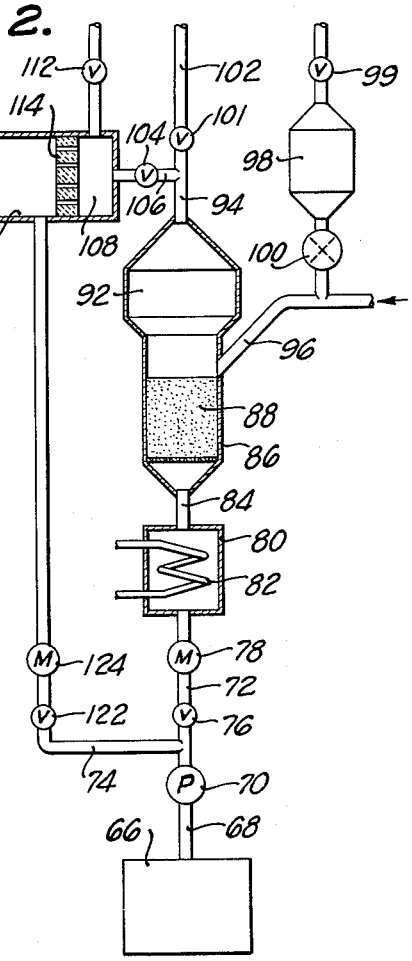

Sol W. Weller, Santa Ana, Calif., assignor to Ford Motor Company, Dearborn, Mich., a corporation of Delaware
Filed Oct. 5, 1961, Ser. No. 143,191
7 Claims. (Cl. 73—147)

This invention relates to high temperature gaseous streams and, more particularly, provides a method for producing a hot gas stream especially suitable for use in aerodynamic testing.

The now available methods for preparation of hot gas streams for aerodynamic testing for the most part, involve indirect heating of air or other gas. In one method large amounts of electrical energy are introduced into the gas to raise its temperature through a discharge of a condenser bank. This method does not permit continuous operation and sometimes results in plasma formation with resultant uncertainty as to the species present and equivalent temperature. Another procedure involves heating a stream of air by passage of the air through a heated bed of pebbles, typically made of zirconia. The zirconia pebble bed is commonly heated to about 1800° F. and the resultant air temperature is limited to 1200° F.–1300° F. The pebbles have exhibited a tendency to spall and powder at the desired higher temperatures. Still another method involves the passage of air or nitrogen through a heater heated either resistively or inductively. The latter procedure has been limited in its application by the availability of construction materials when attempt is made to operate above 2500° F. and also by the difficulty of providing adequate heat exchange surfaces for heating large volumes of air.

Another procedure described in U.S. patent to Sabol, No. 2,799,159, relies on exothermic decomposition of various oxides of nitrogen to produce high temperature gaseous streams. The reaction provides an oxygen and nitrogen mixture suitable for use in wind tunnels. However, the preheat temperature required for the reaction to proceed at a suitable rate is objectionably high for the several oxides of nitrogen. For instance, the preheat temperature required for the exothermic decomposition of nitric oxide is above 1600° F.

The improved process of the invention permits the production of hot gaseous streams of exceedingly high temperatures with the introduction of the heat being accomplished directly, rather than indirectly as by the use of heaters or pebble beds. The process of the invention involves utilization of a chemical reaction which may be initiated at a relatively low temperature of, for example, about 750° F. for nitric oxide, considerably lower than the temperatures required to initiate the direct decomposition of nitric oxide as in the Sabol process described above. The hot gaseous stream of the invention contains high temperature gaseous products from the reaction of carbon, e.g., powdered charcoal, channel black or thermal black, with an oxide of nitrogen, for example nitrous oxide, nitric oxide, nitrogen dioxide or a mixture of the oxides. Preferably the nitrogen oxide is present in an excess over that required to react with the carbon in order that the high heat content of the products from the carbon (C) and nitrogen oxide reaction may be used to initiate the exothermic decomposition of a further quantity of the nitrogen oxide. Typical chemical reactions exemplifying the two-step nature of the preferred embodiment of the process are:

(1) $2NO + 2C \rightarrow N_2 + 2CO + 96$ kcal.

(2) $2NO \rightarrow N_2 + O_2 + 43$ kcal.

The process of the invention in its preferred embodiment provides a manner to carry out the two foregoing reactions jointly and in varying proportions in order that hot gaseous products of varying compositions and temperatures may be generated at will. In the reactions set forth above nitric oxide (NO) has been selected for illustrative purposes. It should be understood that other oxides of nitrogen including nitrous oxide ($N_2O$) and nitrogen dioxide ($NO_2$) or mixtures of various oxides of nitrogen may also be used to an advantage. A mixture of nitric oxide and nitrogen dioxide may be used to a particular advantage.

In the preferred embodiment of the process of the invention the Reaction 1 above, which is very exothermic, is used to provide the high temperature needed to initiate Reaction 2. Reactions 1 and 2, when nitric oxide and carbon are used in the ratio of 2 mols of nitric oxide to 1 mol of carbon, can be combined to give the following overall reaction:

(3) $2NO + C \rightarrow N_2 + CO + \frac{1}{2}O_2$

At the high temperatures of the resulting gaseous product, carbon monoxide (CO) is relatively inert chemically toward both oxygen ($O_2$) and water. For many applications the CO may be lumped with the nitrogen ($N_2$) as an inert gas. The physical properties of CO and $N_2$ are very similar. The hot product gas stream from Reaction 3 may be considered to contain four volumes of inert gas ($N_2 + CO$) to one volume of oxygen, and thus to be a kind of synthetic air. It will be appreciated that the composition of the high temperature gaseous product may be readily varied and the temperature likewise altered by employing different proportions of the nitrogen oxide and carbon. It is sometimes desirable to mix the high temperature gaseous product stream with air before introducing the gases to the wind tunnel.

In one form of the process of the invention a preheated stream of an oxide of nitrogen is passed through a fluidized bed of carbon particles. The product stream from the fluidized bed is mixed with a stream of an oxide of nitrogen, the high heat content of the carbon bed stream being utilized to promote the exothermic decomposition of the nitrogen oxide to oxygen and nitrogen.

In still another form of the process of the invention, carbon particles are introduced into a heated gaseous stream of the nitrogen oxide, the gaseous stream being at a temperature in excess of that required to initiate Reaction 1 above and below the temperature required to kindle Reaction 2. The nitrogen oxide is present in a considerable excess over that required for the substantially complete reaction of the carbon. The carbon is permitted to react with a portion of the nitrogen oxide and the high heat content of the resulting gaseous product is employed to initiate exothermic decomposition of a further quantity of the nitrogen oxide in accordance with Equation 2 above.

The foregoing objects and advantages of the invention, together with various other objects and advantages, will become evident to those skilled in the art in light of the following disclosure and drawing. In the drawing:

FIG. 1 is a schematic flow diagram of a system suitable for the practice of a preferred embodiment of the process of the invention; and FIG. 2 is a schematic flow diagram of another system for performing the process.

With reference to FIG. 1, there is illustrated a typical wind tunnel installation comprising a compressor 10 connected through a line 12 containing a valve 14 to a reservoir or settling chamber 16. High pressure gas leaves the settling chamber through a typical converging-diverging venturi conduit 18 to a test section 20 which contains a model 22.

The system for preparation of the high temperature gaseous stream includes a nitrogen oxide reservoir 24, a supply line 26 opening into a two-section decomposition chamber 28. The supply line between the reservoir 24 and the decomposition chamber 28 contains in series a pump 30, a valve 32 and a meter 34.

The decomposition chamber 28 has a first section 36 separated from a second section 38 by a perforated flashback-preventing barrier 40. The first section 36 contains a heating coil 42 connected to a power source by terminals 44. The first section 36 is provided with a pressure relief valve 46.

The oxide of nitrogen, which will usually be nitric oxide or nitrous oxide, is supplied either as a liquid or in a gaseous form to the first section 36 of the decomposition chamber 28 where the nitrogen oxide is heated to a temperature below that temperature at which the oxide undergoes a rapid thermal decomposition, but above that temperature at which the oxide reacts rapidly with powdered carbon, e.g., charcoal. The heated gas then passes through the perforated barrier 40 into the second section 38 of the decomposition chamber where it reacts with powdered charcoal supplied in a carrier gas, preferably an oxide of nitrogen, through a line 50. Powdered carbon having a particle size within the range of 0.02 to 1 micron is desirably used, although larger particles may be utilized to a somewhat less advantage. The powdered charcoal or other carbon is contained in a hopper 52, preferably under pressure, and is fed at a constant rate into the carrier gas stream of a line 54 by a rotating vane feeder 56. The hopper 52 is filled through a valve 53. It is desirable that the charcoal containing carrier gas stream be heated to approximately the temperature of the nitrogen oxide of the first section 36 before it is admitted into the second section 38 of the decomposition chamber 28. To this end there is supplied a heater 57 which contains a resistor coil, through which heater the carrier gas stream of line 50 passes.

The powdered charcoal reacts with a portion of the nitrogen oxide, quickly raising the temperature of the second section 38 to a temperature in excess of that required to initiate decomposition of the remaining nitric oxide. The reactions proceed continuously within the second section 38 and the gaseous reaction products are passed through a conduit 60 which contains a valve 62 into the reservoir 16. In some instances it will be desirable to mix the hot gaseous product stream of conduit 60 with compressed air, in which event the compressor 10 will be operated and the valve 14 of line 12 opened. In other instances it may be desirable to use only the hot gaseous product stream in which case valve 14 is closed. It is possible by varying the ratio of the two reactants (namely the charcoal and the nitrogen oxide) to alter the temperature and the composition of the hot gaseous product. It will also be appreciated that the compressed air from the compressor 10 mixed with the hot gaseous product may be used in a similar fashion to regulate temperature and composition.

The system illustrated in FIG. 2 provides another way of producing the hot gaseous stream of the invention. An oxide of nitrogen, either as a liquid or high pressure gas, is stored in a reservoir 66. A line 68 out of the nitrogen oxide reservoir 66 contains a pump 70 and immediately beyond the pump the line divides into a first branch 72 and a second branch 74.

The first branch 72 contains in series a valve 76 and a meter 78. The first branch 72 opens into an oxide heating chamber 80 which contains a heating coil 82. In this chamber 80 the stream of oxide of nitrogen is heated to a temperature below that at which the oxide decomposes and above that temperature at which the nitrogen oxide reacts rapidly with powdered charcoal. The heated oxide stream leaves the chamber 80 in a line 84 and is introduced to the base of a vessel 86 which contains a fluidized bed 88 of powdered charcoal. The nitrogen oxide stream passing through the vessel 86 is responsible for maintaining the powdered charcoal in a suspended fluidized state in accordance with well-known practice. The vessel 86 is provided with considerable head space 92 which permits the reaction between the charcoal and nitrogen oxide to reach substantial completion before the gaseous product stream is removed via a line 94.

Make-up charcoal is supplied to the fluidized bed 88 via a line 96. The powdered charcoal, contained in a hopper 98 which is preferably pressurized, is fed at a constant rate through a rotating vane feeder 100 into a carrier gas stream which may be a nitrogen oxide. The hopper 98 is filled through a valve 99. Because of the favorable reaction kinetics and excess of charcoal, all of the nitrogen oxide passing through the fluidized bed 88 will be converted to nitrogen and carbon monoxide in accordance with Reaction 1. If desired, the high temperature gaseous product stream from the head space 92 may be sent directly by a line 94, an open valve 101 and a line 102 to a wind tunnel test section. However, in most instances it will be desirable to employ the high heat content of the gaseous product from the fluidized bed to kindle the decomposition reaction of a further quantity of nitrogen oxide in accordance with Equation 2 above, in which event valve 101 is closed and a valve 104 in a line 106 connected to the earlier mentioned line 94 is opened and the hot gaseous product stream is introduced to a first section 108 of a decomposition chamber 110.

The first section 108 of the decomposition chamber 110 is provided with a pressure relief valve 112 and is separated by a perforated barrier 114 from a second reaction section 116. The second branch 74 delivers a stream of nitrogen oxide to the reaction section 116 through an open valve 122 and a meter 124. From the reaction section 116 the resulting gaseous product stream is removed via line 126 and passed to a wind tunnel for use. As described earlier in connection with the system illustrated in FIG. 1, the hot gaseous stream may go undiluted to a test section of the wind tunnel or may be mixed with compressed air.

Although exemplary embodiments of the invention have been disclosed herein for purposes of illustration, it will be understood that various changes, modifications and substitutions may be incorporated in such embodiment without departing from the spirit of the invention as defined by the claims which follow.

I claim:

1. In a method of testing aerodynamic characteristics of a model at high temperatures, the improvement comprising:

reacting a heated stream of an oxide of nitrogen with less than a stoichiometric amount of carbon to produce a high temperature gaseous product containing carbon monoxide and nitrogen and utilizing the high heat content of the gaseous product to initiate the composition of a further quantity of the nitrogen oxide to produce oxygen and nitrogen; and suspending the model being tested in the resulting gaseous stream from the foregoing reactions.

2. A method of preparing a high temperature gaseous stream comprising:

introducing carbon particles into a heated gaseous stream of an oxide of nitrogen, said oxide of nitrogen being present in a considerable excess over that required for the substantially complete reaction of the carbon;

permitting said carbon to react in an exothermic reaction with a portion of the oxide of nitrogen to form a high temperature gaseous product of nitrogen and carbon monoxide; and utilizing the high heat content of the foregoing carbon reaction to initiate the exothermic decomposition of a further quantity of nitrogen oxide to provide the high temperature gaseous products of nitrogen and oxide.

3. A method of preparing a high temperature gaseous stream comprising:
  passing a stream of an oxide of nitrogen through a fluidized bed of carbon particles, said nitrogen oxide stream being at a temperature adequate to initiate the exothermic reaction of the nitrogen oxide and carbon to produce high temperature gaseous products of nitrogen and carbon monoxide; and
  introducing the high temperature gaseous product stream from the carbon bed into a stream of an oxide of nitrogen and utilizing the high heat content of the carbon bed stream to initiate the exothermic decomposition of the oxide of nitrogen to oxygen and nitrogen.

4. A method of preparing a high temperature gas stream suitable for use in wind tunnel testing, said method comprising:
  reacting an oxide of nitrogen with carbon to produce a high temperature gaseous product containing carbon monoxide and nitrogen and utilizing the high heat content of the gaseous product to initiate the decomposition of a further quantity of the nitrogen oxide to produce oxygen and nitrogen.

5. A method in accordance with claim 4 wherein the oxide of nitrogen is nitric oxide.

6. A method in accordance with claim 4 wherein the oxide of nitrogen is a mixture of nitric oxide and nitrogen dioxide.

7. A method in accordance with claim 4 wherein the reactants of carbon and oxide of nitrogen are utilized in proportions providing a high temperature gaseous stream containing approximately four volumes of nitrogen and carbon monoxide to one volume of oxygen.

References Cited by the Examiner
UNITED STATES PATENTS

| | | | |
|---|---|---|---|
| 2,130,163 | 9/38 | Tiddy et al. | 252—372 |
| 2,799,159 | 7/57 | Sabol | 73—147 |
| 2,974,019 | 3/61 | Sabol | 23—284 |

RICHARD C. QUEISSER, *Primary Examiner.*

DAVID SCHONBERG, *Examiner.*